United States Patent [19]

Eccher et al.

[11] Patent Number: 5,246,232
[45] Date of Patent: Sep. 21, 1993

[54] METHOD AND APPARATUS FOR DETERMINING PARAMETERS OF THE MOTION OF AN OBJECT

[75] Inventors: Daniel J. Eccher, Loveland; James P. Thome, Fort Collins, both of Colo.

[73] Assignee: Colorado Time Systems, Loveland, Colo.

[21] Appl. No.: 823,849

[22] Filed: Jan. 22, 1992

[51] Int. Cl.[5] ............................................. A63B 69/36
[52] U.S. Cl. .............................. 273/184 R; 273/186.1; 273/183.1; 342/109; 342/118
[58] Field of Search ........... 273/183 R, 184 R, 185 R, 273/186 R, 186 B, 186 C, 25, 26 R, 29 R, 186.1, 183.1; 342/104, 107, 109, 118, 127, 134, 135

[56] References Cited

U.S. PATENT DOCUMENTS

| | | | |
|---|---|---|---|
| 3,438,031 | 4/1969 | Fathauer | 343/8 |
| 3,508,440 | 4/1970 | Murphy | 73/379 |
| 3,938,809 | 2/1976 | Gentiluomo | 273/176 |
| 4,137,566 | 1/1979 | Haas et al. | 273/183 B |
| 4,276,548 | 6/1981 | Lutz | 343/7 |
| 4,545,576 | 10/1985 | Harris | 273/25 |
| 4,673,183 | 6/1987 | Trahan | 273/185 R |
| 4,858,922 | 8/1989 | Santavaci | 273/26 |
| 5,082,263 | 1/1992 | Berger | 273/61 R |
| 5,092,602 | 3/1992 | Witler et al. | 273/184 R |

OTHER PUBLICATIONS

"DistanceCaddy" advertising brochure distributed by Colorado Time Systems, Inc.

*Primary Examiner*—Jessica Harrison
*Attorney, Agent, or Firm*—Sheridan Ross & McIntosh

[57] ABSTRACT

The present invention provides a method and apparatus for determining a desired parameter of the motion of an object. In one embodiment, the device can be used to calculate the estimated carry distance of a golf shot. The golfer uses a keypad to enter the golf club being used and the units of measure desired for the output display. A Doppler radar system is employed to illuminate the golf ball immediately after it has been hit. A reflected return signal is detected and difference pulses are generated, having a frequency which is proportional to the velocity of the ball. The difference pulses are processed by a microprocessor to determine if the radar beam has "locked" onto the ball. If so, the microprocessor is used to calculate the carry distance by dividing a predetermined constant by the average period of the difference pulses. The carry distance can be displayed on the device itself or on a remote display, and/or can be stored in memory for later recall or transmission to an external computer. The microprocessor can also be programmed to calculate and display the ball's velocity. An acoustic trigger can be used to activate the radar circuitry only when the sound of a golf ball being struck by a golf club is detected.

38 Claims, 7 Drawing Sheets

METHOD AND APPARATUS FOR DETERMINING PARAMETERS OF THE MOTION OF AN OBJECT

TECHNICAL FIELD OF THE INVENTION

This invention relates to a method and apparatus for determining desired parameters of the motion of an object, such as, for example, the estimated carry distance of a golf ball.

BACKGROUND OF THE INVENTION

Various methods and apparatus have been devised for measuring characteristics of the motion of an object, such as velocity, estimated distance the object will travel ("carry distance"), spin, momentum, and trajectory. Radar devices have been developed which utilize the Doppler frequency shift to measure the velocity of the moving object. Very briefly, electromagnetic energy, such as microwave radar energy, which is transmitted toward and reflected by a moving object undergoes a frequency shift, the magnitude of which is proportional to the velocity of the object relative to the transmitter. Samples of the transmitted and reflected radiation are mixed and processed to obtain a difference signal having a frequency which is equal to the difference between the transmitted and reflected frequencies, this difference being the Doppler shift. Once the difference frequency has been obtained, the relative velocity of the object can be readily calculated.

Many Doppler radar devices count the number of pulses in the difference signal during a predetermined period of time or "window." If the width of the window (i.e., the period of time) is chosen properly, the number of pulses which are counted will equal the velocity of the object in the desired units (such as miles per hours or kilometers per hour). To determine the width of the window, it is necessary to apply the following formula:

$$f_d = (2 f_t V_r)/V_c$$

where $f_d$ is the Doppler frequency; $f_t$ is the frequency of the transmitted radiation; $v_r$ is the relative velocity of the object; and $v_c$ is the velocity of light in appropriate units. For a transmission frequency $f_t$ of about 10.5 GHz (a typical operating frequency for Doppler radar), $f_d$ equals about 31.3 $v_r$ (in miles per hour). The width of the window is the inverse of 31.3, or about 31.9 milliseconds, and the number of difference frequency pulses counted will give the object's velocity in miles per hour. For example, an object moving 100 miles per hour would produce a signal with a Doppler difference frequency of about 3,130 Hz. The number of pulses in the signal counted during a window having a width of 31.9 milliseconds is about 100, which is the velocity of the object in miles per hour.

A significant disadvantage of pulse counting to obtain the velocity of an object is that signal "drop-outs", noise and other interference may increase or decrease the actual number of pulses counted during the window period, thereby degrading the accuracy of the device. For reasons which are not fully known, a portion of the reflected signal may not be detected, leading to periods during which no pulses are received (drop-out periods). Additionally, noise can introduce false pulses, thereby increasing the number counted. While various filtering techniques have been proposed to reduce the effects of noise, they may not be completely effective and may have little or no ability to offset the effects of signal drop out.

Many Doppler radar devices employ phase lock loop (PLL) circuitry to "lock" onto the difference frequency and to generate a voltage which is proportional to the Doppler frequency. Additionally, an internal oscillator is synchronized with the frequency of the difference signal and provides an output signal at that frequency. The status of the constant voltage output can be used to determine when the PLL has locked onto the moving object (i.e. when the oscillator becomes synchronized with the difference signal). When synchronization occurs, the constant voltage output can be used to initiate the counting of pulses from the oscillator during the predetermined window.

When a PLL Doppler radar device is on, the PLL generates an output signal regardless of whether a lock has not been achieved. This signal, which resembles random noise, can, in some circumstances, make it difficult for a lock to be accomplished. Additionally, such a device typically requires many components and may, in fact, have to be fabricated on several circuit boards. This raises reliability issues related to the quality control of parts and production. It can be appreciated that a relatively high failure rate can result in increased production costs when faulty units are rebuilt, repaired or simply discarded.

Many Doppler radar devices employ a resistive/compactive (RC) network in order to establish the width of the timing window. Using known equations, the values of the components in the RC network can be calculated to enable a capacitor to charge to a predetermined level, thereby activating or deactivating a counter. Precise and expensive components are necessary to provide a very accurate system; even when precision components are employed, accuracy may suffer due to age, heat and the like. Crystal controlled timing circuits are generally more accurate but may be more expensive than an RC network and may require additional components to produce usable timing pulses.

Both methods of establishing a window width have the common disadvantage of being relatively inflexible when more than one window width is desired. For example, if velocity is a desired in units of kilometers per hour rather than miles per hour, the window width should be about 5.1 milliseconds for a transmission frequency of about 10.5 GHz. Consequently, some means, such as additional timing circuitry, must be included to allow the desired units to be selected.

Another application in which it is desirable to select from among different window widths involves the use of a Doppler radar device to calculate the distance an object can be expected to travel. For example, during custom golf club fitting or during golf training and practice, it can be useful to know how far a golf ball will travel ("carry distance"). During golf club fitting, the golfer can try out different sized clubs and clubs from different manufacturers to determine which will enable him or her to consistently hit the farthest. During lessons or practice, a golfer can change his or her grip, stance or swing in order to adjust or maximize the carry distance of the golf ball. It can be appreciated, therefore, that accurate information about the ball's carry distance would be extremely useful. It would also be useful to be able to obtain such information indoors in a relatively small enclosed space.

A further disadvantage to counting pulses during a window period is that the ball may be near or beyond the range of the device before the end of the window, making the device more susceptible to noise and interference and reducing its accuracy. Increasing the range of the device, such as by increasing its power output or the input gain, may be expensive or impractical and may cause the device to be more sensitive to moving objects other than the desired target.

Consequently, it is desirable to provide increased accuracy with a single radar unit having selectable parameters without relying on fixed timing windows and without employing an excessive number of circuit components. It is also desirable for such a device to be faster and less susceptible to noise and drop-outs than existing devices.

SUMMARY OF THE INVENTION

In accordance with the present invention, a method and an apparatus are provided for determining a desired parameter of the motion of the object. The method and apparatus of the present invention can be employed to determine a number of parameters regarding the motion of a variety of moving objects including, for example, vehicles and other craft, runners, and thrown or struck balls. The present invention is particularly applicable to estimating the carry distance of a golf ball after being struck by a golf club, even if the ball is hit indoors into a net only a short distance from the golfer.

The method of the present invention includes the steps of causing a golf ball to move by striking it with a golf club, reflecting radiation off of the golf ball after it is in motion, positioning a receiver in such a location that it is receiving the reflected radiation, obtaining a sequence of difference pulses having a frequency substantially proportional to the velocity of the moving golf ball, determining the period of the pulses, and dividing a predetermined constant by the period to calculate the desired parameter. The step of determining the period of the difference pulses can include the steps of comparing the deviation between the periods of two consecutive difference pulses with a predetermined range of acceptable deviations, and calculating the average period of the pulses. The method can further comprise the step of ascertaining whether the sequence of difference pulses is sufficiently stable to enable the period to be determined; i.e., whether a lock has been achieved.

The method of the present invention can also include the step of selecting the club type and selecting the predetermined constant from one of a plurality of predetermined constants based upon the club type selected. Additionally, the method of the present invention can include the step of storing the calculated parameter and the selected club type in a memory device, such as a nonvolatile memory device. The calculated parameter can be displayed and/or outputted through an interface.

The apparatus of the present invention includes means for receiving radiation reflected off of a golf ball after it has been struck by a golf club, means for generating a sequence of difference pulses having a frequency substantially proportional to the velocity of the moving golf ball, means for determining the period of the difference pulses, and means for applying the period to a preselected constant to calculate the parameter. Preferably, the determining means and the applying means comprise a microprocessor programmed to carry out the instructions necessary to perform the calculations to determine the parameter.

The apparatus can also include means for entering a golf club type, means for storing a plurality of predetermined constants and means for selecting one of the predetermined constants based on the club type selected. A memory, such as a nonvolatile memory, can also be provided for storing the selected club type and the calculated parameter. The apparatus also can include means for activating the apparatus only upon impact of the golf club against the golf ball, such as with an acoustic trigger, thereby preventing the generating means from generating the sequence of difference pulses until the golf ball is struck. Means for interfacing the apparatus with an external computer and means for displaying the calculated parameter can also be included.

BRIEF DESCRIPTION OF THE DRAWINGS

FIG. 1b is a top view of the apparatus illustrated in FIG. 1a;

FIG. 1c is a perspective view of the bottom of the apparatus illustrated in FIG. 1a;

FIG. 3a illustrates an exemplary waveform of a difference signal after reflection by a golf ball;

FIG. 3b illustrates difference pulses generated from the difference signal of FIG. 3a.

DETAILED DESCRIPTION

Figure 1A:
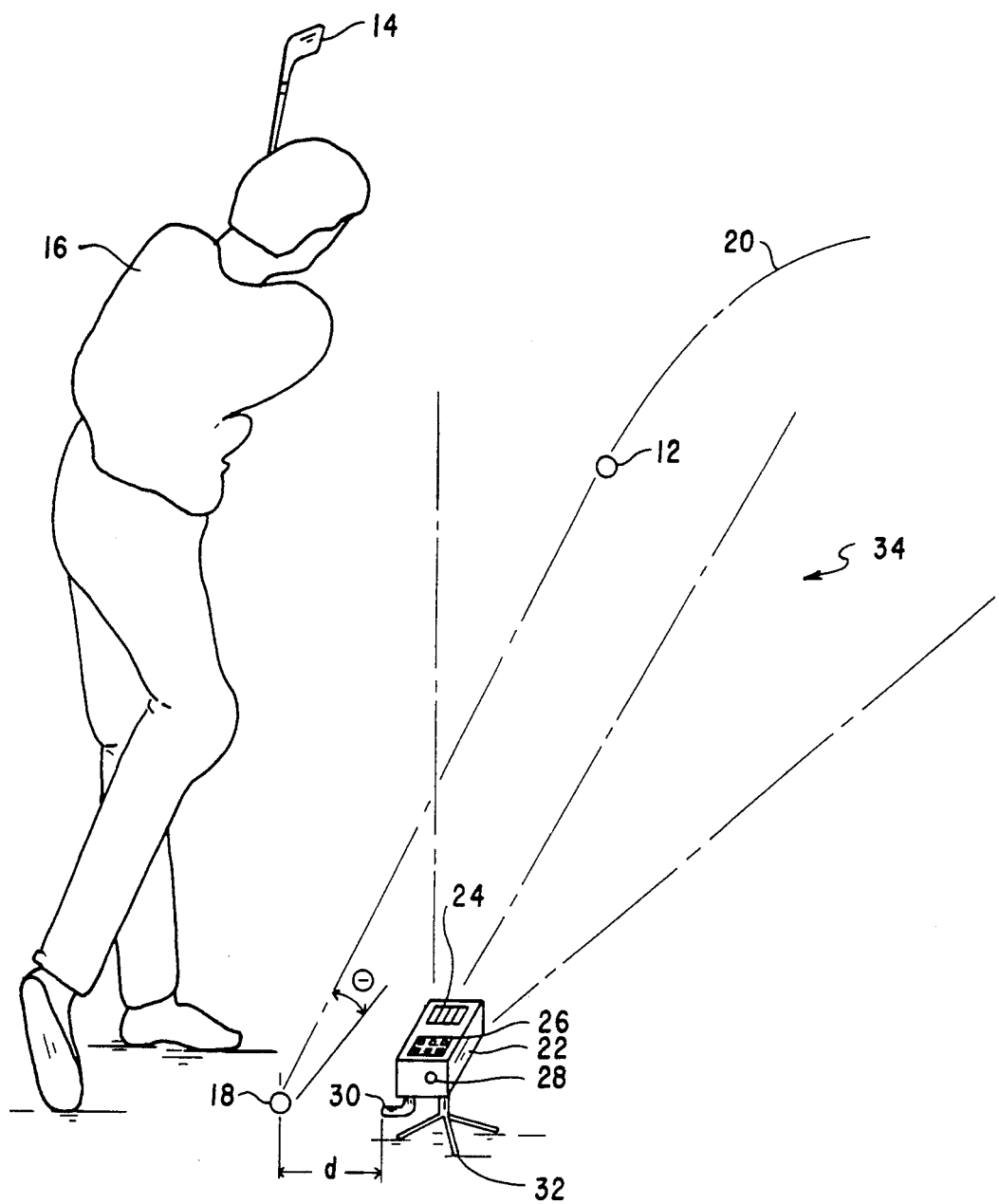
FIG. 1a illustrates one embodiment of the apparatus of the present invention positioned proximate to a golf tee and a golfer.

FIG. 1a illustrates an apparatus 10 of the present invention for estimating the carry distance of a golf ball 12 after it has been struck by a golf club 14 in the hands of a golfer 16. Both the apparatus 10 and the method of the present invention can be employed to determine other parameters of the motion of other objects but will be described herein with respect to a particular application, that of estimating the carry distance of a golf ball. The golf ball 12 in FIG. 1a is shown after being hit off of a starting point 18 (such as a tee) and is in flight on a trajectory having an initial launch angle $\Theta$ and represented by the dot-dashed line 20.

Figure 1C:
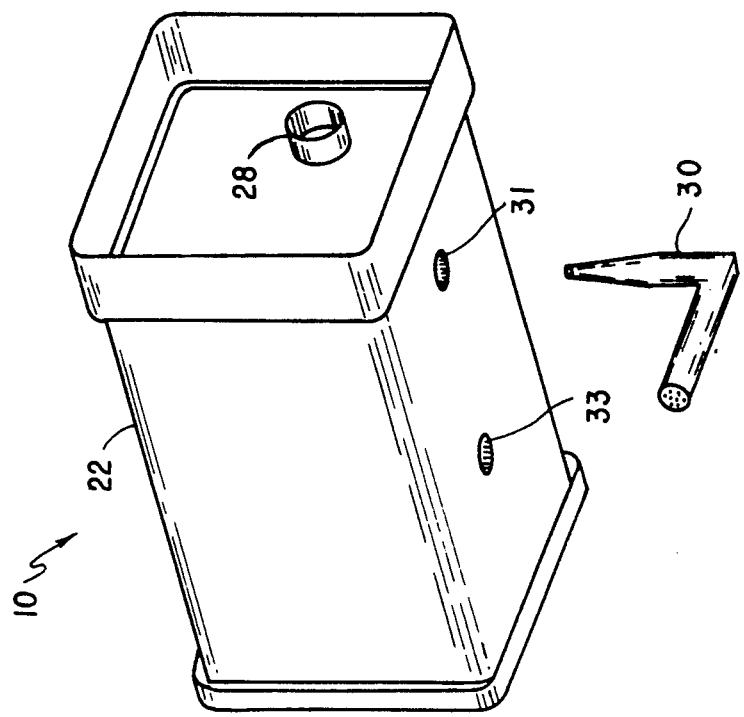
Figure 1B:
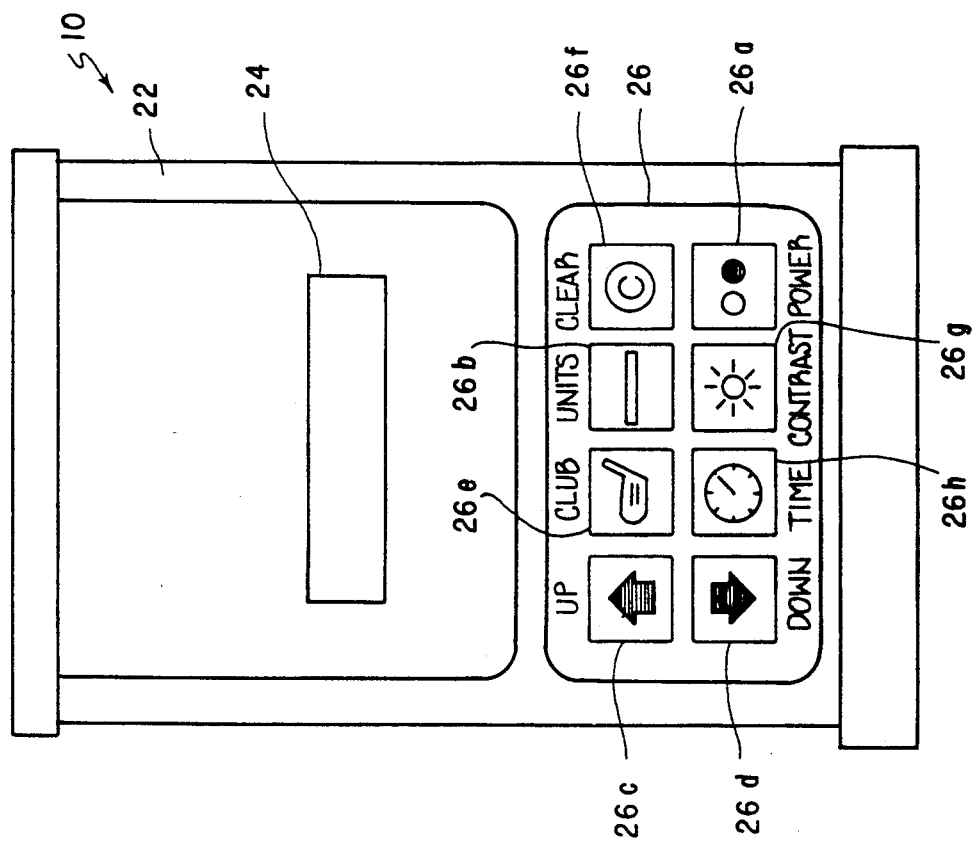

The apparatus 10 includes a housing 22 having an alphanumeric display 24 and a keypad 26, both preferably mounted on the top of the housing 22 (FIG. 1b) for convenient viewing and key manipulation by the golfer 16. Additionally, the apparatus 10 can include a jack 28, shown on the back of the housing 22, to facilitate interconnecting the apparatus 10 with an external power source, a battery charger, a remote display, and/or an external computer. The apparatus 10 can also include a microphone 30 which can plug into another jack 31 in the bottom of the housing 22 (FIG. 1c) and interconnect with acoustic trigger circuitry within the apparatus 10. For satisfactory operation of the microphone 30 and associated trigger circuitry, the housing 22 is preferably mounted on a small tripod 32 positioned a distance d from the starting point 18. The tripod 32 can screw into a threaded opening 33 in the bottom of the housing 22 or can be permanently secured to the housing 22. As will be explained in more detail below, upon impact of the golf club 14 against the golf ball 12, the microphone 30 and associated trigger circuitry activates the apparatus 10 which transmits microwave radiation, indicated generally as 34, in the direction of the ball's trajectory 20. Radiation is reflected off of the ball 12 back to the apparatus 10 where portions of the transmitted and received radiation are mixed to generate a difference signal having a frequency substantially proportional to the velocity of the ball 12. The difference signal is processed and a series of difference pulses are produced, having the same frequency as the difference signal, and the average period of the pulses is determined. The average period is applied to a predetermined constant and the result displayed on the display 24 as the estimated carry distance of the golf ball 12. The velocity of the golf ball 12, or other moving object, can be determined in a similar manner.

Figure 2:
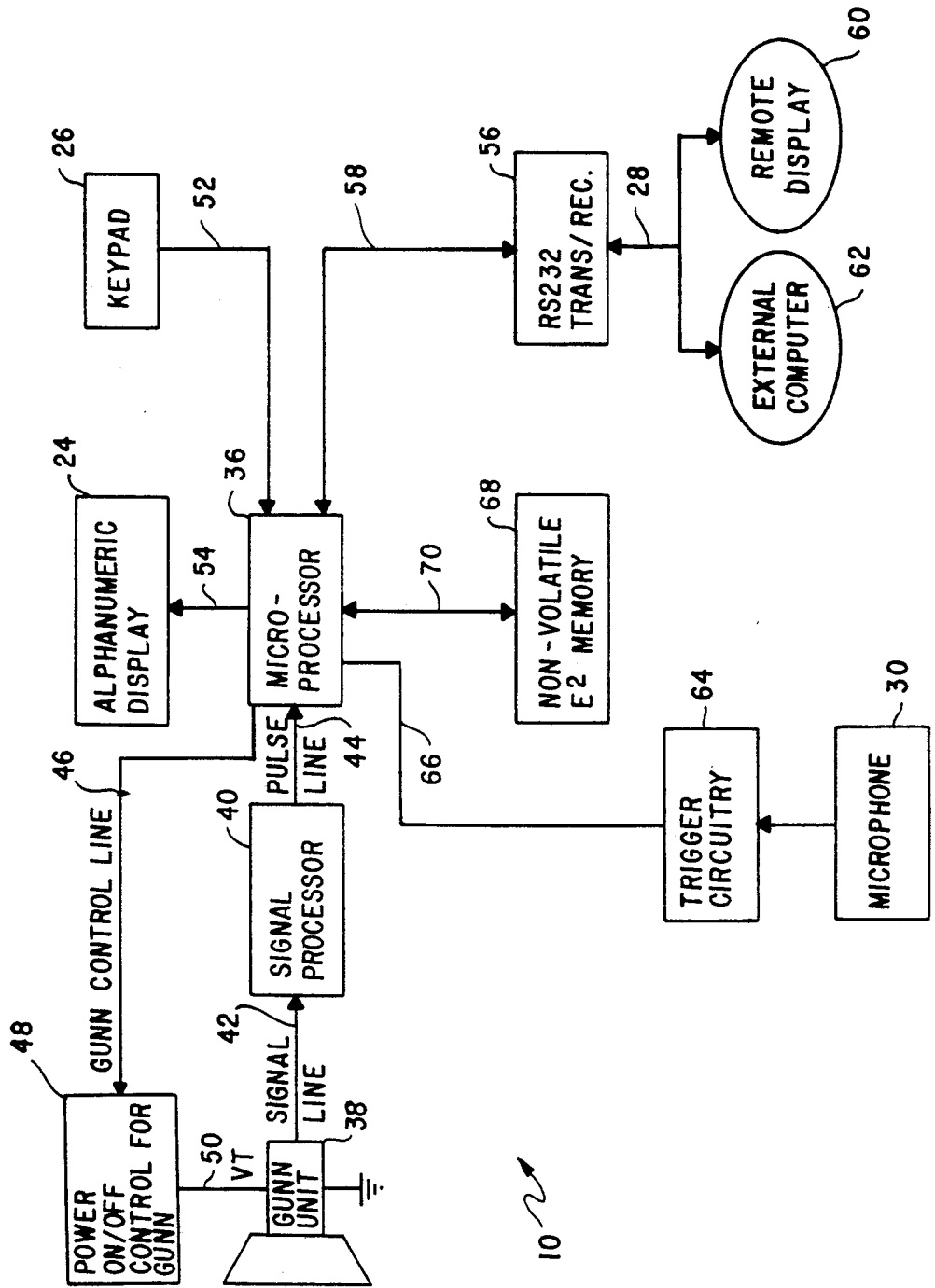
FIG. 2 is a block diagram of one embodiment of the apparatus of the present invention.

FIG. 2 is a block diagram of the apparatus 10. The apparatus 10 includes a microprocessor 36, such as a low power version of the 6805 microprocessor (i.e., an MC68HC705C8) having three parallel ports, internal RAM and ROM and an internal universal asynchronous receiver/transmitter (UART). A Gunn diode/mixer assembly 38 for transmitting, receiving and mixing microwave energy is interconnected with the microprocessor 36 through a signal processor 40. A signal line 42 carries difference signals generated by the Gunn assembly 38 to the signal processor 40 and a pulse line 44 carries difference pulses generated by the signal processor 40 to the microprocessor 36. A Gunn control line 46 carries control signals from the microprocessor 36 to a power supply 48, interconnected with the Gunn assembly 38 by a voltage line 50, to activate and deactivate the Gunn assembly 38. The keypad 26, having an on/off key, is interconnected with the microprocessor 36 by a series of lines 52 and the display 24 is interconnected with the microprocessor 36 by another series of lines 54.

An interface, such as a serial (RS-232) interface 56, can be interconnected with the microprocessor 36 by lines 58 to couple the apparatus 10 with a remote display 60 or an external computer 62. These external devices 60 and 62 can plug into the interface 56 by means of the jack 28 on the housing 22.

The microphone 30, if used, plugs into the jack 31 on the housing 22 and connects with trigger circuitry 64. When the microphone 30 is plugged in and the apparatus 10 turned on, the Gunn assembly 38 remains deactivated until the microphone 30 detects an impact sound and causes the trigger circuitry 64 to send a signal on a control line 66 to the microprocessor 36 to activate the Gunn assembly 38.

Additionally, a memory device, such as a nonvolatile memory 68, can be interconnected with the microprocessor 36 by a set of memory lines 70 for semi-permanent storage of calculated data.

For clarity, FIG. 2 does not show the power sources and voltage regulators which supply power to the various components of the apparatus 10. Preferably, a rechargeable battery (or set of batteries) is employed to power the apparatus 10. An external A.C. adapter can be plugged into the jack 28 to supply power and/or recharge the internal battery when the apparatus 10 is used indoors or near an A.C. outlet.

In operation, the golfer 16 positions the housing 22 proximate to the starting point of the golf ball 12. The Gunn assembly 38 is pointed in the direction of the expected trajectory 20 of the golf ball 12 and, if used, the microphone 30 is plugged into the bottom of the housing 22 and pointed at the starting point 18. Preferably, the housing 22 is positioned across the starting point 18 from the golfer 16 as illustrated in FIG. 1. The housing 22 can alternatively be positioned directly behind the starting point 18, although care must be taken to prevent it from being struck by the golf club 14 during the golfer's 16 swing or from receiving radiation reflected from the golf club 14 during the golfer's follow-through rather than from the golf ball 12 after it has been struck. Also preferably, the microphone 30 is highly directional and the trigger circuitry 64 adjusted so that it will only respond to impact sounds within a relatively short distance in the direction toward which the microphone 30 is pointed. A distance d of about 12 to 18 inches enables the trigger circuitry 64, when appropriately adjusted, to only respond to the sound of the impact of the club 14 against the ball 12 and not respond to impacts caused by nearby golfers (such as might occur at a driving range where several or many golfers are lined up practicing their golf shots).

The golfer 16 turns the apparatus 10 on and can enter the desired units of measurement (i.e., yards, feet, meters) by pressing the appropriate keys on the keypad 24. Similarly, golfer 16 can select the club type by pressing the appropriate keys on the keypad 24. The display 26, which can be an LCD display capable of displaying eight alphanumeric characters, displays the golfer's selections. For example, the keypad 24 illustrated in FIG. 1b includes eight keys 26a-26h. One key 26a is pressed by the golfer 16 to turn the apparatus 10 on and off. Another key 26b is pressed to indicate to the microprocessor 36 that a display units selection (such as yards, feet or meters) will be made; two keys 26c and 26d are pressed to scroll up and down through the available units displayed on the display 24. A key 26e is pressed to indicate to the microprocessor that a club selection will be made. The up and down scroll keys 26c and 26d are then pressed to make the selection.

Other functions can also be accessed through the keypad 26 such as clearing an entry or the display 24 with a key 26f and adjusting the contrast of the display 24 with a key 26g. The amount of time the carry distance is displayed can be adjusted by pressing an eighth key 26h and then the up or down keys 26c and 26d. It can be appreciated that the microprocessor 36 can be programmed with other functions and that other combinations of key presses can activate less commonly used functions, such as might be desired for calibration purposes.

When the microphone 30 is plugged into the jack 31, the Gunn assembly 38 remains deactivated until the trigger circuitry 64 is activated. If the microphone 30 is not plugged in, the Gunn assembly 38 will transmit radiation when the apparatus 10 is turned on and attempt to receive reflected radiation and generate a difference signal on the signal line 42. It can be appreciated that the life of the internal battery will be increased if the microphone 30 is used.

When the golf ball 12 is struck by the golf club 14 at the starting point 18, the microphone 30 receives the impact sound and sends a signal to the trigger circuitry 64 which, in turn, transmits a trigger signal to the microprocessor 36 by way of the control line 66. The microprocessor 36 transmits a control signal by way of the control line 46 to the power supply 48 which, in turn, applies voltage to the Gunn assembly 38. The Gunn assembly 38 transmits microwave radiation and receives radiation reflected by the golf ball 12 in flight.

The Gunn assembly 38 also mixes a portion of the transmitted radiation with the reflected radiation and generates a different signal on the signal line 42 which has a frequency substantially equal to the difference between the frequencies of the transmitted and received radiation. Because of the Doppler effect, the frequency of the difference signal is proportional to the velocity of the moving golf ball 12.

Figures 3A, 3B:
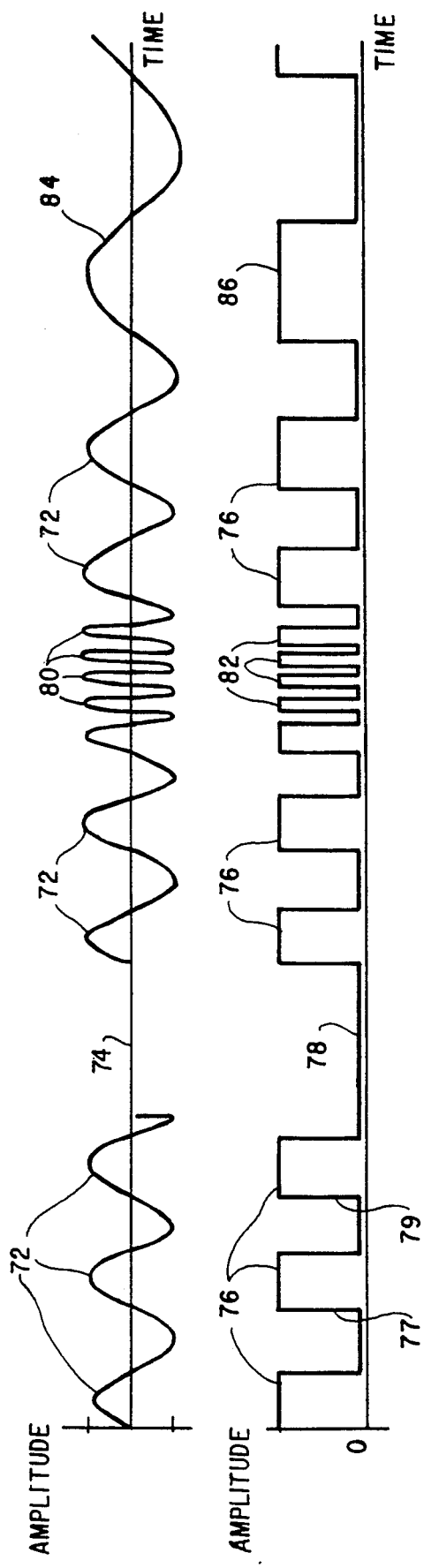

FIG. 3a illustrates the waveform of an exemplary difference signal generated by the Gunn assembly 38 and shows a number of strong peaks 72 of substantially uniform frequency, flat area 74 where the difference signal has "dropped out" and areas 80 and 84 during which the frequency of the difference signal is significantly greater or less than the frequency of the signal at 72. The signal processor 40 processes the difference signal and generates a corresponding series of square waves or difference pulses 76 (FIG. 3b) on the pulse line 44. During the period of time 74 in which the difference signal has dropped out, no difference pulses are generated, as shown by area 78 in FIG. 3b. The series of difference pulse is received by the microprocessor 36 which determines the period of each difference pulse and then calculates the average period of those which have substantially uniform or valid periods (i.e., pulses 76). The microprocessor 36 then recalls a predetermined constant from among a plurality of constants in its internal memory based upon the club type and units selected by the golfer 16 through the keypad 26.

It can be appreciated that golf balls having the same initial velocity but different launch angles Θ (FIG. 1), caused by impact with golf clubs having different head angles, will travel different distances. For example, a driver is typically used to obtain maximum distance and imparts a relatively low launch angle (relative to the horizon) to the golf ball. At the other extreme, a pitching wedge imparts a relatively high launch angle (about 57°) to the golf ball and causes the ball to travel a shorter distance over obstructions. Various woods and irons have head angles which vary between the two foregoing extremes and, therefore, cause the golf ball to travel correspondingly different distances if given the same initial velocity.

To avoid the use of complicated, space consuming and potentially expensive circuitry needed to actually measure the initial launch angle and calculate the carry distance from well-known equations, the apparatus 10 of the present invention employs the microprocessor 36 to store predetermined constants to provide accurate carry distance calculations for each club type and each set of units (i.e., yards, feet, meters) selected. To calibrate, the microprocessor 36 was programmed to display the period of the difference pulses when the golf ball 12 was struck with each different club. Because an effort was made to impart substantially the same initial velocity to the golf ball 12 each time it was struck, the displayed period was substantially the same for all clubs used. The average period was then multiplied by the actual distance the ball traveled when struck by each different club to obtain the predetermined constant for each club. Predetermined constants for each set of units were calculated by multiplying the original constant for each club type by an appropriate conversion factor. All of the predetermined constants were programmed into the ROM portion of the microprocessor 36 and the apparatus 10 tested. Minor adjustments were made, as necessary, to the constants in order to match the displayed distance to the actual distance as closely as possible.

In actual operation, after the microprocessor 36 applies the appropriate constant to the average period of the valid difference pulses 76, the resulting estimated carry distance can be displayed on the display 24. In addition to, or in lieu of, displaying the carry distance on display 24, the carry distance can be transmitted to the remote display 60 or to an external computer 62 through the serial interface 56. If the apparatus 10 includes the nonvolatile memory 68, each calculated carry distance and its associated club selection can be stored in the nonvolatile memory 68 which will retain the information even when power has been removed from the apparatus 10. Depending upon the particular memory chip employed, 500 or more distances and club selections can be stored. At a later time, the external computer 62 can be interconnected with the microprocessor 36 through the serial interface 56 and the microprocessor 36 directed to download the information from the memory 68 into the external computer 62. There, it can be printed out, displayed and/or stored on a hard or floppy disk. Thus, each golfer using the apparatus 10 can keep a record of his or her golfing activity.

Figure 4A:
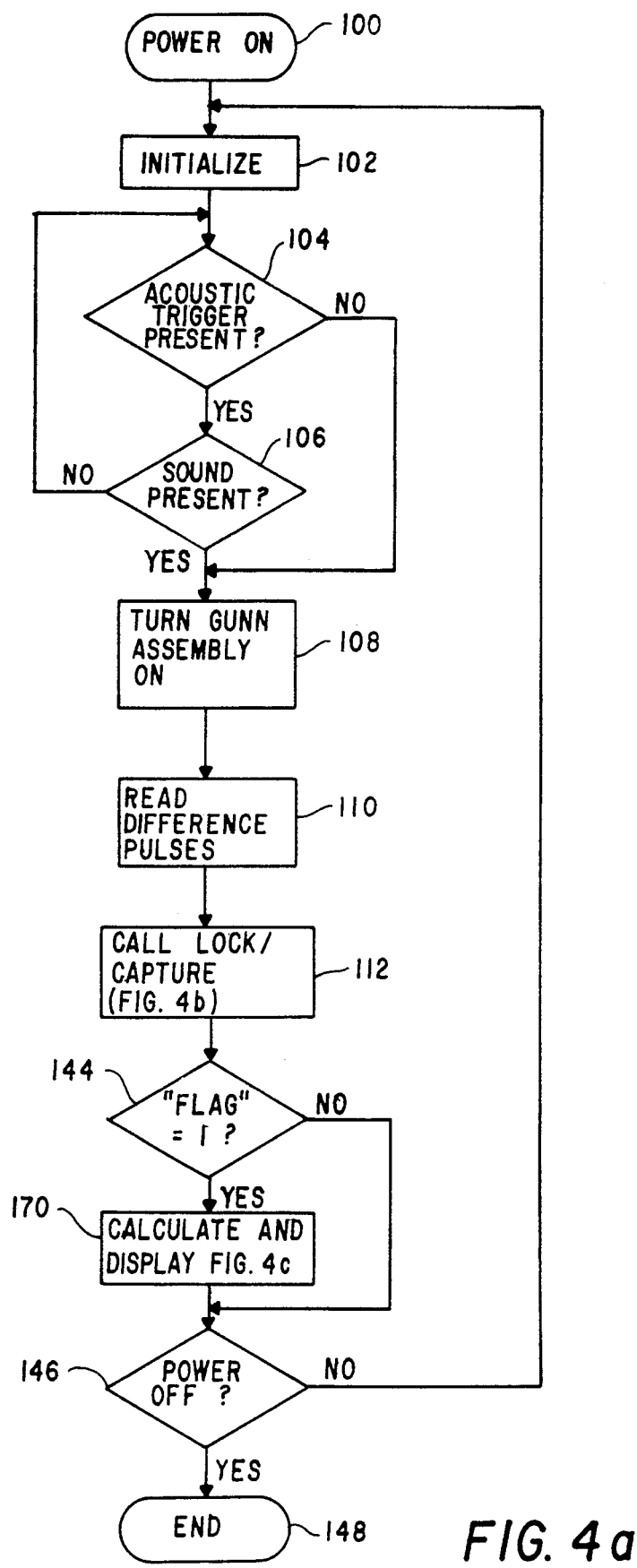
FIGS. 4a–4c are flow charts of one embodiment of the method of the present invention.
Figure 4B:
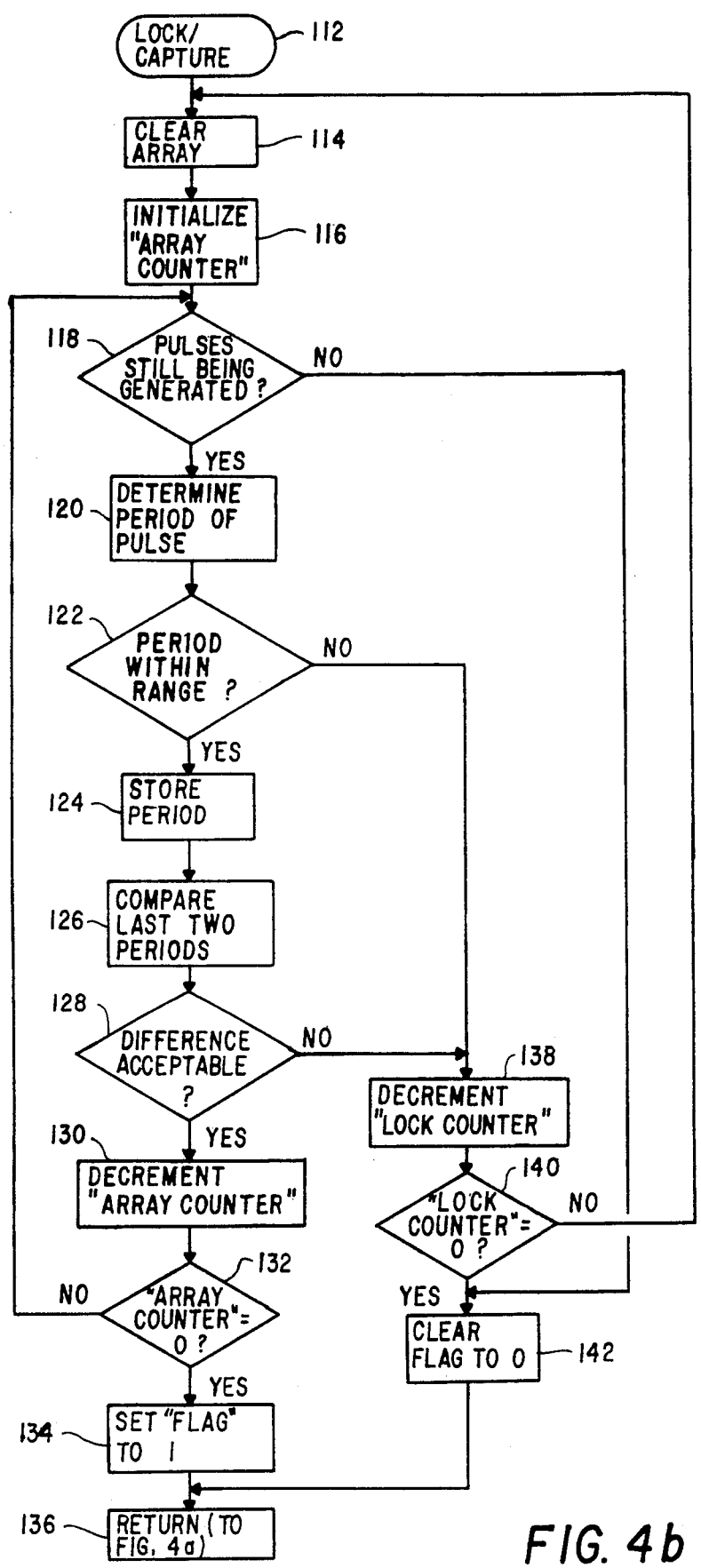

The process for estimating the carry distance of the golf ball 12 will now be discussed with reference to the flow charts of FIGS. 4a–4c. In order to simplify the illustration of the process, certain "housekeeping" tasks of the microprocessor 36 have not been shown at various points in the flow charts. These include, for example, periodically checking the keypad 26 for a key press (and the corresponding processing of such a key press), checking the condition of the internal battery, and checking the status of the serial interface 56 for any instructions transmitted by the external computer 64, if any. When the golfer 16 presses the on/off key on the keypad 26 (step 100, FIG. 4a), the microprocessor 36 begins executing instructions. Program variables, including a variable "LockCounter" as discussed below with respect to FIG. 4b, are initialized 102 and the microprocessor 36 determines 104 whether the microphone 30 is present. If so, the microprocessor 36 determines 106 whether an impact sound has been detected. If the microphone 30 is present but an impact sound has not been detected, the Gunn assembly 38 is not turned on and the microprocessor 36 checks again to determine whether the microphone 30 is still present 104 and, if so, whether an impact sound has been detected 106. When sound is detected, or if the microphone 30 is not present, the Gunn assembly is turned on 108. Upon activation, the Gunn assembly 38 transmits microwave radiation, receives radiation reflected off of any object in its path (such as the golf ball 12), mixes a portion of the transmitted radiation with the received radiation, and generates a difference signal. The signal processor 40 then generates 110 a series of difference pulses which are sent to the microprocessor 36.

After the Gunn assembly 38 has been activated 108 and difference pulses are being generated and read 110, the microprocessor 36 executes a routine Lock/Capture 112 to determine whether a lock has been achieved on the moving ball 12 and, if so, to calculate the estimated carry distance.

Referring to FIG. 4b, an array, or series of memory locations in the microprocessor 36, is cleared 114 and a variable "Array Counter" is set 116 to the number of locations in the array. This is the number of consecutive "valid" periods (as defined below) which must be received and processed for an estimated carry distance of satisfactory accuracy to be calculated. Then, it is determined 118 whether the difference pulses are still being generated. If so, the period of one of the difference pulses (the "current" pulse) is measured 120 by determining the difference in the status of an internal clock at the beginning of the current difference pulse (i.e., the rising edge 77, FIG. 3b) and the status of the internal clock at the beginning of the next difference pulse (i.e., the rising edge 79). Next, the microprocessor 36 determines 122 whether the measured period is reasonable by determining whether it is within a range of predetermined periods. For example, the period of the current pulse can be compared with values representing velocities of about 15 miles per hour and about 320 miles per hour since the velocity of a golf ball will typically be within this range. Values outside of this range are assumed to be meaningless and will be ignored.

If the "Current Period" is within the specified range, the "Current Period" is stored 124 in the array and then subtracted 126 from the last period stored in the array. The deviation is compared 128 to a previously established number representing the allowable tolerance between the periods of difference pulses. If the deviation between the two periods is within the desired tolerance, the "Current Period" is deemed to be valid and "Array Counter" is decremented 130. The "Array Counter" is next examined 132; if it does not yet equal zero (indicating that the array is not full), the program loops back to step 118 and the foregoing process repeats until the "Array Counter" equals zero (the array is full) or the loop is otherwise exitted. When the "Array Counter" equals zero, a "Flag" is set 134 to 1 and execution returns 136 to FIG. 4a where another routine is called to calculate and display the carry distance.

If the "Current Period" is not within the desired range 122 or if the deviation between two consecutive periods is not acceptable 128, "LockCounter" is decremented 138 and then examined 140. If "LockCounter" does not equal zero, the program loops back to step 114 and the process repeats. If "LockCounter" equals zero at step 140, or if pulses are no longer being generated at step 118, the "Flag" is cleared 142 to 0 and execution returns 136 to FIG. 4a.

For example, if "Array Counter" is initialized in step 116 to 32 and "LockCounter" initialized in step 102 to 4, then 32 consecutive periods must be valid, and their values captured and stored in the array, in order for a lock on the ball to have been achieved and the values processed. If any period is not valid because it is outside of the acceptable range (step 122) or because the deviation between two consecutive pulses is too great (step 128), up to three additional attempts are made to fill the array with thirty-two valid periods. If these attempts also fail, the "Flag" is cleared 142 to 0 and execution returns 136 to FIG. 4a. Additionally, in one embodiment of the present invention, the trigger circuitry 64 (FIG. 2) includes a monostable multivibrator, or "one-shot", having an on-time of, for example, about 400 milliseconds. If the circuitry 64 shuts off the Gunn assembly 38 at any time during the routine illustrated in FIG. 4b, such a change in state will be detected at step 118, the "Flag" will be cleared 142 to 0 and execution return 136 to FIG. 4a.

Referring again to FIG. 4a, the "Flag" is examined 144 and, if it has not yet reached zero, it indicates that a lock has not yet been achieved; it is then determined 146 whether the power on/off key has been pressed. If so, execution ends 148; if not, the program loops back to step 102 and the foregoing process repeats.

If, on the other hand, the "Flag" was set to 1, as determined in step 144, then the predetermined number of consecutive, valid periods have been received and captured in the array and the microprocessor 36 executes a routine 170 to actually calculate and display the carry distance of the golf ball 12.

Figure 4C:
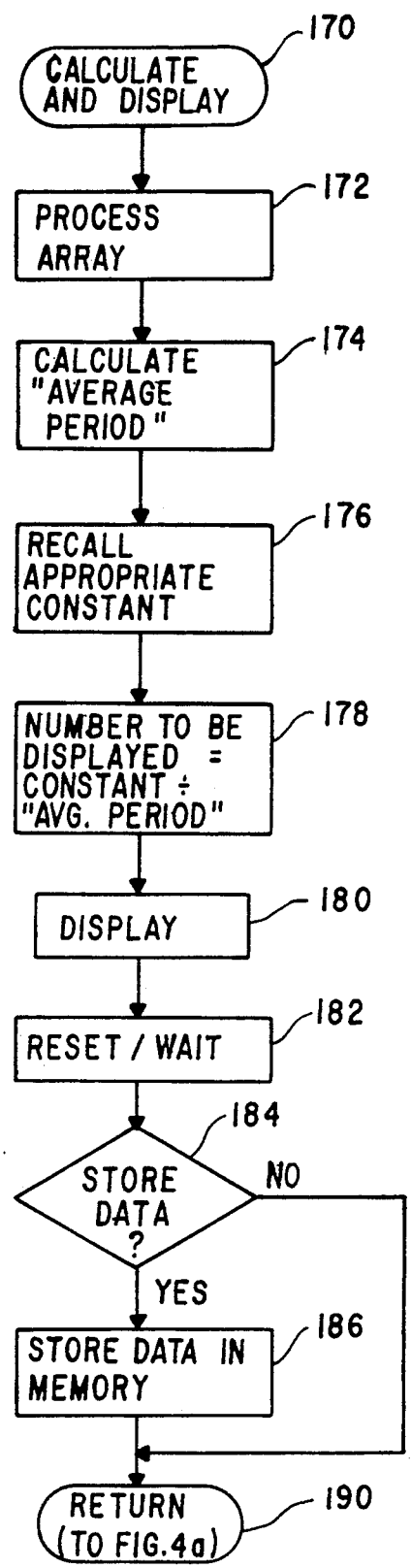

Referring now to FIG. 4c, the values in the array are processed 172 and selected values are averaged 174 to generate the "Avg Period", thus improving accuracy and repeatability. The appropriate constant is then recalled 176, based upon the selected club type and desired units as previously detailed, and the carry distance calculated 178 by dividing the constant by the "Avg Period". This number is then displayed 180 on the display 24 of the housing 22 and, if desired, sent to the remote display 60 or to the external computer 62. The number can be displayed for a predetermined amount of time 182 after which the display 24 displays the current club setting. While the carry distance is being displayed, the Gunn assembly 38 is off to conserve power.

Additionally, the microprocessor 36 determines 184 whether the carry distance and club selection are to be stored in the memory 68. If so, a routine 186 is called to do so; otherwise, or after the data has been stored, execution of the program returns 190 to the main program (FIG. 4a). If the power on/off key on the keypad 24 has been pressed 146 to turn off the apparatus 10, then the program ends 148. Otherwise, the program loops back to step 102 and the apparatus 10 waits for another golf ball 12 to be hit.

If the first thirty-two difference pulses generated are valid and result in a lock and capture, then the estimated carry distance can be calculated after only thirty-two periods have been generated. For a ball traveling about 200 miles per hour, the Doppler frequency is approximately 6260 Hz and the period of the difference pulses is about 160 microseconds. Consequently, the microprocessor 36 would begin calculating the estimated carry distance after approximately 5.1 milliseconds (160 microseconds per period times 32 periods). By contrast, a Doppler device which counts the number of difference signals within a fixed window cannot begin calculating the estimated carry distance until the end of that window. Thus, regardless of the velocity of the golf ball, such a device would require about 31.9 milliseconds after a lock has been achieved before the carry distance could be determined. During such a length of time, the Doppler device could lose its lock on the golf ball and/or noise, interference or drop-outs could affect the accuracy of the device. It can be appreciated that an increase in the window width (i.e., an increase in the length of time required for counting) may be required with such devices if other units or other club settings are desired.

The effects of such disadvantages in prior devices are reduced in the apparatus and method of the present invention by determining the period of the difference pulses rather than counting the number of difference pulses. The total amount of time required can be reduced further if the number of valid difference pulse periods required for obtaining a lock and for averaging the period are reduced. Therefore, the present invention is not limited to employing any particular number of periods for obtaining a lock and for averaging; the numbers thirty-two and four are disclosed herein for exemplary purposes only.

Although the present invention has been described in detail, it should be understood that various changes, substitutions and alterations can be made herein without departing from the spirit and scope of the invention as defined by the claims set forth herein.

What is claimed is:

1. An apparatus for indicating the estimated carry distance of a golf ball after being struck by a golf club held by a golfer, comprising:
   a) a microwave transmitter for transmitting radiation at a first frequency;
   b) a receiver positioned relative to the golf ball before it is struck such that the receiver receives radiation transmitted by said transmitter and reflected by the golf ball after being struck by the golf club, wherein said received radiation has a second frequency different from said first transmitted frequency by an amount substantially proportional to the velocity of the golf ball;
   c) means, coupled to said transmitter and to said receiver, for generating a sequence of difference pulses having durational periods substantially proportional to the reciprocals of corresponding frequency differences between said transmitted first signal frequency and said received second signal frequency, and having a first output line to carry said sequence of difference pulses;
   d) a processor for generating a value equal to an estimated distance the golf ball would travel, said processor comprising:
      i) an input line coupled to said first output line;
      ii) a clock for generating clock pulses at a predetermined constant rate;
      iii) means for comparing a number of clock pulses representing the periods of successive difference pulses in said sequence of difference pulses to obtain differences in periods between said successive difference pulses and for identifying valid difference pulses dependent on whether the obtained differences are within a predetermined range;
      iv) a register for accumulating a sum equal to the number of clock pulses representing a predetermined number of said valid difference pulses;
      v) averaging means for calculating the average period of said predetermined number of said valid difference pulses;
      vi) means for dividing a predetermined constant by said average period; and
      vii) a second output line coupled to said processor; and
   e) a display, coupled to said second output line, for indicating the estimated carry distance of the golf ball.

2. The apparatus of claim 1, further comprising an acoustic trigger coupled to said means for generating.

3. The apparatus of claim 1, further comprising a first memory for storing of a plurality of constants.

4. The apparatus of claim 3, wherein:
   the apparatus further comprises a keypad coupled to said processor for entering a club type; and
   said processor is operable to select said predetermined constant from among said plurality of constants based upon said entered club type.

5. The apparatus of claim 4, further comprising a second memory for storing said entered club type and the indicated distance.

6. The apparatus of claim 5, wherein said second memory is non-volatile memory.

7. The apparatus of claim 1, further comprising an interface coupled to said processor.

8. The apparatus of claim 1, wherein:
   the apparatus further comprises a keypad coupled to said processor for entering a desired units for said display; and
   said processor is operable to select said predetermined constant from among said plurality of constants based upon entered units.

9. An apparatus for determining a parameter regarding the motion of a golf ball struck by a golf club held by a golfer, comprising:
   a) means for transmitting radiation at a first frequency into the expected path of said golf ball;
   b) means for receiving a portion of said transmitted radiation reflected off of said golf ball after said golf ball has been struck by said golf club, said received radiation having a second frequency;
   c) means, coupled to said receiving means, for generating a sequence of difference pulses having durational periods substantially proportional to the reciprocals of corresponding frequency differences between said transmitted first signal frequency and said received second signal frequency, wherein said frequency differences are substantially proportional to the velocity of the moving golf ball;
   d) means for determining the period of said difference pulses;
   e) means for dividing a preselected constant by said period to calculate the parameter.

10. The apparatus of claim 9, wherein said determining means comprises a processor coupled to said generating means.

11. The apparatus of claim 10, wherein said dividing means comprises said processor.

12. The apparatus of claim 9, further comprising:
    means for entering a golf club type to be used by the golfer.

13. The apparatus of claim 12, wherein said dividing means comprises:
    a) means for storing a plurality of predetermined constants; and
    b) means for selecting one of said plurality of predetermined constants based upon the club type selected.

14. The apparatus of claim 12, further comprising a memory for storing the selected club type and the calculated parameter.

15. The apparatus of claim 14, wherein said memory is a non-volatile memory.

16. The apparatus of claim 12, wherein said entering means is a keypad.

17. The apparatus of claim 9, further comprising means for activating the apparatus when the golf ball is struck by the golf club.

18. The apparatus of claim 17, wherein said activating means comprises an acoustic trigger.

19. The apparatus of claim 18, wherein said acoustic trigger prevents both said transmitter from transmitting radiation and said generating means from generating said sequence of difference pulses until the golf ball is struck by the golf club.

20. The apparatus of claim 9, further comprising means for interfacing the apparatus with an external computer.

21. The apparatus of claim 20, wherein said interfacing means comprises a serial interface.

22. The apparatus of claim 9, wherein said transmitting means further comprising means for transmitting radiation into the expected path of the golf ball.

23. The apparatus of claim 22, wherein said transmitting means and said receiving means are housed in a single unit.

24. The apparatus of claim 9, further comprising means for deactivating both said means for transmitting and said means for generating after said means for dividing calculates said parameter.

25. A method for determining a parameter regarding the motion of a golf ball struck by a golf club held by a golfer, comprising steps of:
   a) causing said golf ball to move by striking the golf ball with said golf club;
   b) transmitting radiation, at a first signal frequency, into the expected path of said golf ball and reflecting a portion of said radiation off of the golf ball after it is in motion;
   c) positioning a receiver relative to the golf ball before it is struck wherein the receiver receives said reflected radiation, and wherein said received radiation has a second frequency different from said first transmitted frequency by an amount substantially proportional to the velocity of the golf ball;
   d) generating a sequence of difference pulses having durational periods substantially proportional to the reciprocals of corresponding frequency differences between said transmitted first frequency and said received second frequency;
   e) determining the period of said difference pulses; and
   f) dividing a predetermined constant by said period to calculate the parameter.

26. The method of claim 25, wherein said determining step comprises the substeps of:
   a) obtaining the difference between the durational periods of each two consecutive difference pulses of the sequence of difference pulses;
   b) deciding whether each difference pulses is valid by comparing said obtained difference with a predetermined range of acceptable differences;
   c) decrementing a counter when a difference pulse is valid; and
   d) calculating the average period of the valid difference pulses.

27. The method of claim 26, wherein said determining step further comprises the step of repeating said obtaining, deciding and decrementing steps until the completion of thirty-two said decrementing steps.

28. The method of claim 25, further comprising the step of:
   ascertaining whether the sequence of difference pulses is sufficiently stable to enable the period of the difference pulses to be determined.

29. The method of claim 25, further comprising the step of selecting a club type.

30. The method of claim 25, wherein said predetermined constant is selected from one of a plurality of predetermined constants based upon the club type selected.

31. The method of claim 25, further comprising the step of storing the parameter and selected club type in a memory device.

32. The method of claim 31, further comprising the step of storing the parameter and selected club type in a non-volatile memory device.

33. The method of claim 25, further comprising the step of displaying the parameter.

34. The method of claim 25, further comprising the step of outputting the parameter through an interface to an external computer.

35. The method of claim 25, further comprising the step of preventing both said step of transmitting and said step of generating until the golf ball is struck by the golf club.

36. The method of claim 35, wherein said preventing step comprises the steps of:
   a) positioning a microphone proximate to the golf ball before it is struck;
   b) activating trigger circuitry electrically interconnected to the microphone when the golf ball is struck by the golf club; and
   c) commencing both said transmitting and said generating step upon activation of the trigger circuitry.

37. An apparatus for determining a parameter regarding the motion of a golf ball after being struck by a golf club held by a golfer, comprising:
   a) a microwave transmitter for transmitting radiation;
   b) an acoustic trigger, interconnected with said transmitter, for preventing said transmitter from transmitting said radiation before the golf ball is struck and for activating said transmitter when the golf ball is struck;
   c) a receiver positioned relative to the golf ball before it is struck such that the receiver receives a portion of said transmitted radiation that is reflected off said golf ball after said golf ball is struck;
   d) means, interconnected to said transmitter, said receiver, and said acoustic trigger, for generating a signal relating to said parameter regarding the motion of the golf ball, wherein said means for generating remains deactivated until the golf ball is struck and said acoustic trigger is triggered;
   e) means, interconnected with said transmitter and said means for generating, for deactivating said transmitter and said means for generating dependent upon said signal.

38. A method for determining a parameter regarding the motion of a golf ball struck by a golf club held by a golfer, comprising the steps of:
   a) causing said golf ball to move by striking the golf ball with said golf club;
   b) activating a transmitter, by an acoustic trigger, to transmit radiation into the expected path of the golf ball;
   c) positioning a receiver relative to the golf ball before it is struck such that said receiver receives a portion of said transmitted radiation that is reflected off of said golf ball;
   d) activating a means for generating a signal relating to said parameter regarding the motion of said golf ball, wherein said means for generating is interconnected with said transmitter, said receiver and said acoustic trigger, and wherein said step of activating said means for generating is prevented by said acoustic trigger until the golf ball is struck;
   e) deactivating said transmitter and said means for generating dependent on said signal.

* * * * *